US005276273A

United States Patent [19]

Takauji

[11] Patent Number: 5,276,273

[45] Date of Patent: Jan. 4, 1994

[54] ELECTRONIC MUSICAL INSTRUMENT WITH A PARAMETER STORAGE FOR TONE GENERATION INCLUDING AN ENHANCED EDIT FUNCTION

[75] Inventor: Kiyomi Takauji, Hamamatsu, Japan

[73] Assignee: Kabushiki Kaisha Kawai Gakki Seisakusho, Shizuoka, Japan

[21] Appl. No.: 729,199

[22] Filed: Jul. 12, 1991

[30] Foreign Application Priority Data

Jul. 18, 1990 [JP] Japan .................................. 2-190172

[51] Int. Cl.[5] ......................... G10H 7/00; G10H 1/18; H04Q 1/00

[52] U.S. Cl. ........................................................ 84/615

[58] Field of Search .................................... 84/600-602 615, 626, 629, 647, 653, 662

[56] References Cited

U.S. PATENT DOCUMENTS

| | | | |
|---|---|---|---|
| 4,352,311 | 10/1982 | Luce et al. | 84/622 |
| 4,512,230 | 4/1985 | Ezawa et al. | 84/626 |
| 4,791,847 | 12/1988 | Nishimoto | 84/622 |
| 4,915,007 | 4/1990 | Wachi et al. | 84/602 X |
| 4,984,497 | 1/1991 | Inagaki et al. | 84/626 |
| 5,003,859 | 4/1991 | Monte et al. | 84/423 R |
| 5,092,216 | 3/1992 | Wadhams | 84/602 |

FOREIGN PATENT DOCUMENTS 59-126595 7/1984 Japan .

OTHER PUBLICATIONS

Casio, "Casio CZ-1000 Operation Manual," 1985.

*Primary Examiner*—William M. Shoop, Jr.
*Assistant Examiner*—Jeffrey W. Donels

[57] ABSTRACT

An electronic musical instrument such as a synthesizer includes a preset memory for storing, as preset data, a plurality of sets of parameters such as tone colors, tone volumes, pitches, special effects, and the like of tones to be generated. A designated parameter value in the preset data is increased/decreased to edit the preset data. When an edit mode is released, the edited preset data is automatically saved in a recall data memory. When a "comparison" state is set during an edit operation, the preset data which is being edited is saved in the recall data memory, and preset data before editing or another preset data is set as tone generation data. When a "recall" operation is performed, data in the recall data memory is read out as the latest preset data for tone generation. The edit operation is performed while confirming generated tones by alternately executing the "comparison" and "recall" operations.

8 Claims, 9 Drawing Sheets

ELECTRONIC MUSICAL INSTRUMENT WITH A PARAMETER STORAGE FOR TONE GENERATION INCLUDING AN ENHANCED EDIT FUNCTION

BACKGROUND OF THE INVENTION

1. Field of the Invention

The present invention relates to a parameter setting apparatus for an electronic musical instrument, wherein the apparatus sets various parameters for controlling tones generated by the electronic musical instrument.

2. Description of the Prior Art

In general, tone colors, tone volumes, pitches, effects, and the like of tones generated by an electronic musical instrument such as a synthesizer are controlled according to set parameters. When the parameters are set, a parameter setting apparatus is used.

A conventional parameter setting apparatus has a preset memory which stores a plurality of kinds (a plurality of sets) of preset data, each including a set of parameter data associated with various parameters for controlling a tone. When a user selects a specific kind of preset data from the plurality of kinds of preset data, the apparatus reads out the selected preset data from the preset memory, and sets it in a work memory. Parameter data constituting the preset data set in the work memory are supplied to a tone generator. The tone generator forms tone data on the basis of the supplied data, and sends the tone data to a tone production unit including a loudspeaker.

Meanwhile, a parameter setting apparatus of this type has a data edit function capable of changing a content of preset data according to a user's taste.

When data is edited using this function, a user operates an operation member for selecting preset data to call proper preset data in the work memory. When the user designates a kind and value of a parameter to be changed upon operation of the operation member, corresponding parameter data in the preset data in the work memory is rewritten accordingly. Thus, the user can obtain a tone having a desired tone color, effect, and the like.

The edited parameter data on the work memory can be simultaneously stored as preset data in the preset memory, as needed.

In the above-mentioned conventional parameter setting apparatus, parameter data which is edited using the data edit function is set in the work memory. New preset data is selected from the preset memory, and is called in the work memory. In this case, the content of the work memory is rewritten with the called preset data. For this reason, when the user wants to use the currently edited data again after he or she selects new preset data, he or she must temporarily store the edited data in the preset memory.

However, the user often erroneously selects new preset data without storing the edited data in the preset memory due to an operation error of the operation member or when he or she forgets to do so. Then, the edited data are undesirably rewritten with the new preset data, and the edited data can no longer be used. In this case, the user must perform an operation for reproducing the edited data again, and the reproduction operation is not easy, resulting in inconvenience.

An apparatus which can eliminate such a drawback, disclosed in Japanese Patent Laid-Open No. 59-126595 is known. This apparatus has a backup memory for storing parameter data in addition to the work memory. The backup memory is rewritten to always have the same content as that of the work memory. Even when edited data in the work memory is erroneously rewritten with other preset data, the content of the backup memory can be called in the work memory. Thus, the edited data can be easily recalled.

However, according to this apparatus, every time parameter data in the preset data in the work memory are changed, the content of the backup memory must be rewritten, resulting in a long data change processing time. When the number of parameters to be set is increased, the number of processing operations for rewriting the content of the backup memory upon operation of operation members is increased, and the volume of processing to be executed by a data processor (CPU) is increased accordingly. For this reason, an expensive data processor (CPU) having high processing performance must be used, and its execution program is complicated.

In a data edit mode, it is preferable to edit data while comparing tones produced based on the edited data, and preset data before editing or another data stored in the preset memory. In this case, in the conventional apparatus, the edited data set in the work memory must be temporarily stored in the preset memory, and then, preset data to be compared must be read out from the preset memory into the work memory. For this reason, an operation for designating a storage area in the preset memory for storing the edited data in the work memory, and instructing to store the edited data in the designated storage area, and an operation for selecting preset data to be compared, and reading it out in the work memory are required. This results in troublesome operations of the operation members, and it is difficult to quickly and easily compare data. In order to solve this problem, when a data comparison is instructed upon operation of the operation member, the edited data in the work memory can be automatically stored in a special-purpose memory. However, this operation requires another memory.

SUMMARY OF THE INVENTION

It is an object of the present invention to provide a parameter setting apparatus which can reliably back up edited data without increasing data processing volume, processing time, and the like.

It is another object of the present invention to provide a parameter setting apparatus which can quickly and easily compare edited data and preset data.

It is still another object of the present invention to provide a parameter setting apparatus which commonly uses one memory as a backup memory for edited data, and a second memory for fetching edited data upon comparison of data, and can decrease the number of memories, and therefore, save storage area.

According to the present invention, there is provided a parameter setting apparatus for an electronic musical instrument, which sets various parameters for controlling a tone, comprising preset data storage means for storing a plurality of sets of preset data each including a plurality of parameter data associated with the various parameters, supply data storage means which is set with parameter data to be supplied to a tone generator, the supply data storage means being able to selectively set the preset data stored in the preset data storage means as the parameter data to be supplied to the tone generator, and being able to change the parameter data constituting the set preset data upon operation of an operation member, mode selection means for selecting an edit mode for allowing an operator to individually change the parameter data constituting the preset data set in the supply data storage means, data change means for, when a data change operation member is operated while the edit mode is selected by the mode selection means, changing corresponding parameter data of the preset data set in the supply data storage means upon operation of the operation member, recall data storage means for simultaneously storing the parameter data set in the supply data storage means when the edit mode is released, comparison control means for, when a setting operation of a compare state for comparing a tone based in the parameter data set on the supply data storage means at that time and a tone based in one of the preset data stored in the preset data storage means is instructed upon operation of a compare state setting operation member, simultaneously storing the parameter data set in the supply data storage means at that time in the recall data storage means, and thereafter, setting the designated preset data in the supply data storage means, and recall control means for simultaneously setting the parameter data stored in the recall data storage means in the supply data storage means upon operation of a data recall operation member.

The apparatus further comprises determination means for determining whether or not the compare state is set when the edit mode is released, and control means for, when the determination means determines that the compare state is set, inhibiting a storage operation of the parameter data set in the supply data storage means to the recall data storage means when the edit mode is released.

When data are edited using the parameter setting apparatus of the present invention, a set of preset data are selected from a plurality of sets of preset data stored in the preset data storage means, and are supplied to the supply data storage means. At the same time, the edit mode is selected by the mode section means. The operation member is then operated to change desired parameter data in the preset data. When the edit mode is released during the edit operation or after the completion of the edit operation, the edited data set in the supply data storage means are simultaneously and automatically stored in the recall data storage means.

Therefore, after the edit mode is released, when new preset data are set in the supply data storage means, and the edited data set in the supply data storage means so far are rewritten with the new preset data, a user can operate the operation member to read out the edited data stored in the recall data storage means, and can easily recall the edited data.

When the edited data are to be compared with preset data during a data edit operation, a user instructs to set a comparison mode upon operation of the operation member. Thus, parameter data set in the supply data storage means at that time are simultaneously and automatically stored in the recall data storage means, and thereafter, designated preset data are set in the supply data storage means. Upon completion of comparison between the edited data and the preset data by, e.g., hearing tones produced based on the preset data set in the supply data storage means, the user operates the operation member to recall the edited data stored in the recall data storage means into the supply data storage means, and can continue the data edit operation.

When the determination means and the control means for performing control according to a determination result of the judgment means are arranged, if the determination means determines that the comparison mode is set when the edit mode is released, data in the supply data storage means are not stored in the recall data storage means even when the edit mode is released.

DETAILED DESCRIPTION OF THE PREFERRED EMBODIMENT

An embodiment of the present invention will be described below with reference to the accompanying drawings.

Figure 1:
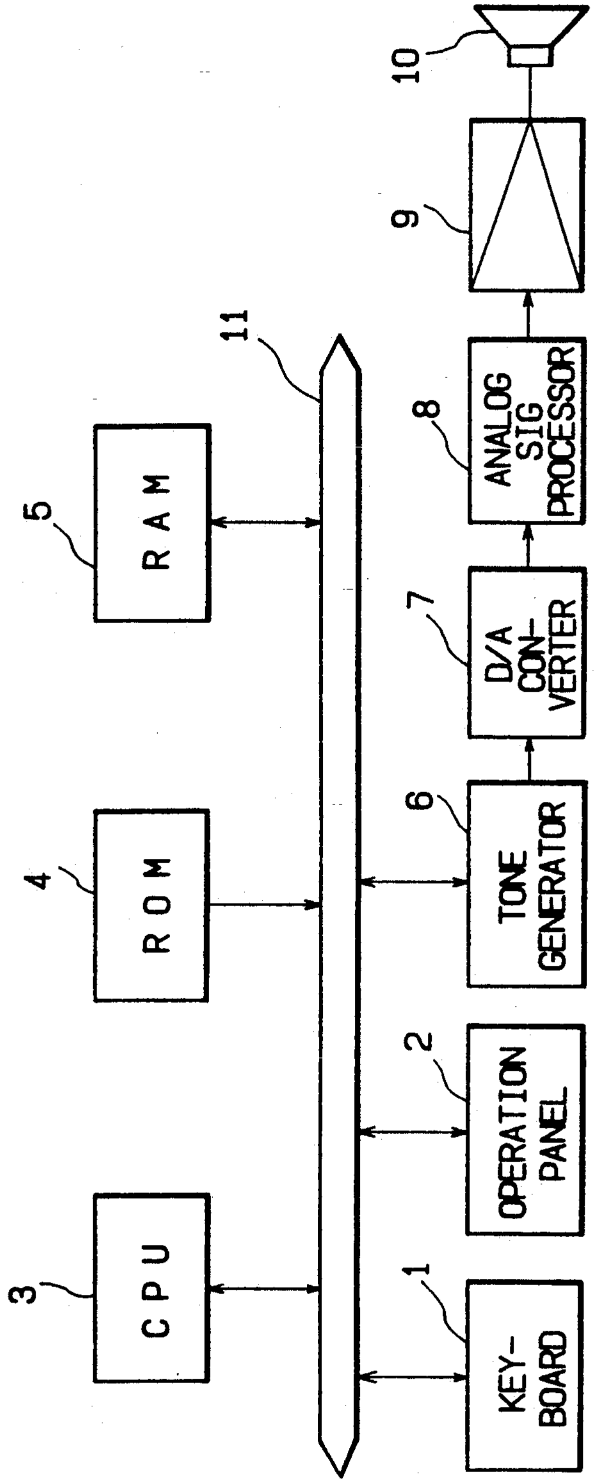
FIG. 1 is a block diagram showing an arrangement of an electronic musical instrument to which a parameter setting apparatus of the present invention is applied.

FIG. 1 is a block diagram for explaining a schematic arrangement of an electronic musical instrument such as a synthesizer, to which a parameter setting apparatus of the present invention is applied.

In FIG. 1, a keyboard 1, an operation panel 2, a CPU 3, a ROM 4, a RAM 5, and a tone generator 6 are connected to a bus line 11 including a data bus, an address bus, and the like, and can exchange data with each other.

The keyboard 1 comprises one or a plurality of keyboards including a plurality of keys and key switches arranged in correspondence with the keys. The key switches can detect ON and OFF key events, and can also detect operation speeds of the keys.

Figure 2:
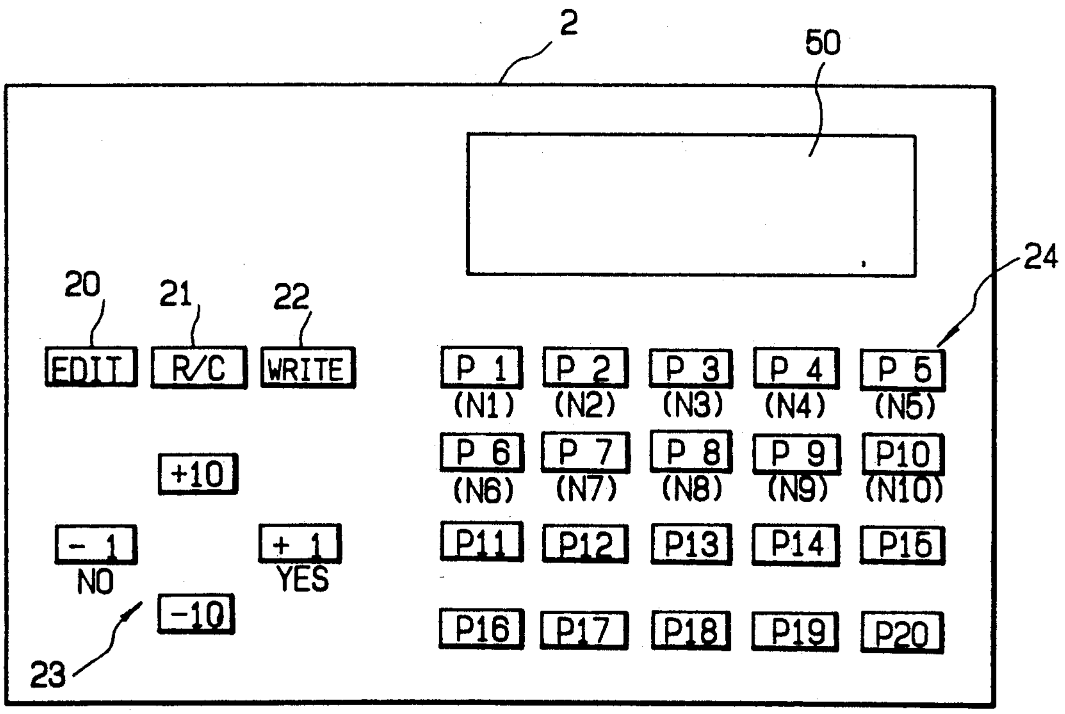
FIG. 2 is a view for explaining an arrangement of an operation panel.

As shown in FIG. 2, various operation members, a display 50 comprising an LCD for displaying various data, and the like are arranged on the operation panel 2.

Of the various operation members, an EDIT switch 20 is an operation member for switching between an edit mode and a play mode. In the edit mode, parameter data constituting preset data (to be described later) can be changed (edited). The play mode is set when the edit mode is released, and in this mode, selection of preset data (selection of tone colors), or the like is performed. Every time the switch 20 is depressed, the edit mode and the play mode are alternately set.

An R/C switch 21 is used for switching between a "recall" function and a "compare" function. When this switch is depressed while the play mode is selected, a data recall function is instructed. When this switch is depressed while the edit mode is selected, a data "compare" function is instructed. The "recall" function of edited data is a function of recalling the last edited data edited in the latest edit mode on a work memory 32 (to be described later). The data "compare" function is a function of reading out original preset data before corresponding data are edited or another preset data onto the work memory 32 (to be described later) during an edit operation, and comparing the readout data and edited data.

A WRITE switch 22 is an operation member for setting a WRITE mode of simultaneously storing edited (or changed) parameter data in a preset memory 31 (to be described later) as preset data, and releasing the WRITE mode.

Data change switches 23 include four operation members, i.e., +10 and −10 switches for incrementing-/decrementing data in units of 10, and +1 and −1 switches for incrementing/decrementing data by one. These switches serve as operation members for setting a number n for designating preset data in the play mode, and serve as operation members for changing parameter data values in the edit mode. Note that the above-mentioned +1 switch is also utilized as an operation member for inputting a response "YES", and the −1 switch is also utilized as an operation member for inputting a response "NO".

Switches 24 include 20 switches P1 to P20. These switches serve as preset data selection operation members for selecting 20 different preset data stored in storage areas P1 to P20 of the preset memory 31 (to be described later) in the play mode. In the edit mode, the switches P1 to P10 serve as operation members for selecting parameter data whose data contents are to be changed according to indications N1 to N10 indicated below these switches when each preset data consists of 10 parameter data. The switches P11 to P20 without indications (N1 to N10) serve as operation members for releasing the edit mode when the edit mode is selected.

The CPU 3 performs scan processing of the key switches of the keyboard 1 and scan processing of the operation members of the operation panel 2 in accordance with a program stored in the ROM 4. Thus, the CPU 3 detects operation states of the keys of the keyboard 1 (ON and OFF events, key numbers of ON keys, velocities associated with operation speeds of keys, and the like), and operations of the operation members of the operation panel 2. The CPU 3 executes processing operations (to be described later) in accordance with operations of the keys or operation members, and also executes the following processing.

More specifically, in order to provide various data associated with processing operation upon operations of the operation members of the operation panel 2 to a user, the CPU 3 sends display data for displaying these data to the display 50. In order to generate tones upon operations of the keys of the keyboard 1, and the operation members of the operation panel 2, the CPU 3 generates corresponding data on the basis of data stored in the ROM 4, and data associated with the operations of the keys and the operation members stored in the RAM 5, and supplies the generated data to the tone generator 6.

The ROM 4 stores a work program for the CPU 3, tone waveform data, display data for the display 50, initial data for the preset data, and the like.

Figure 3:
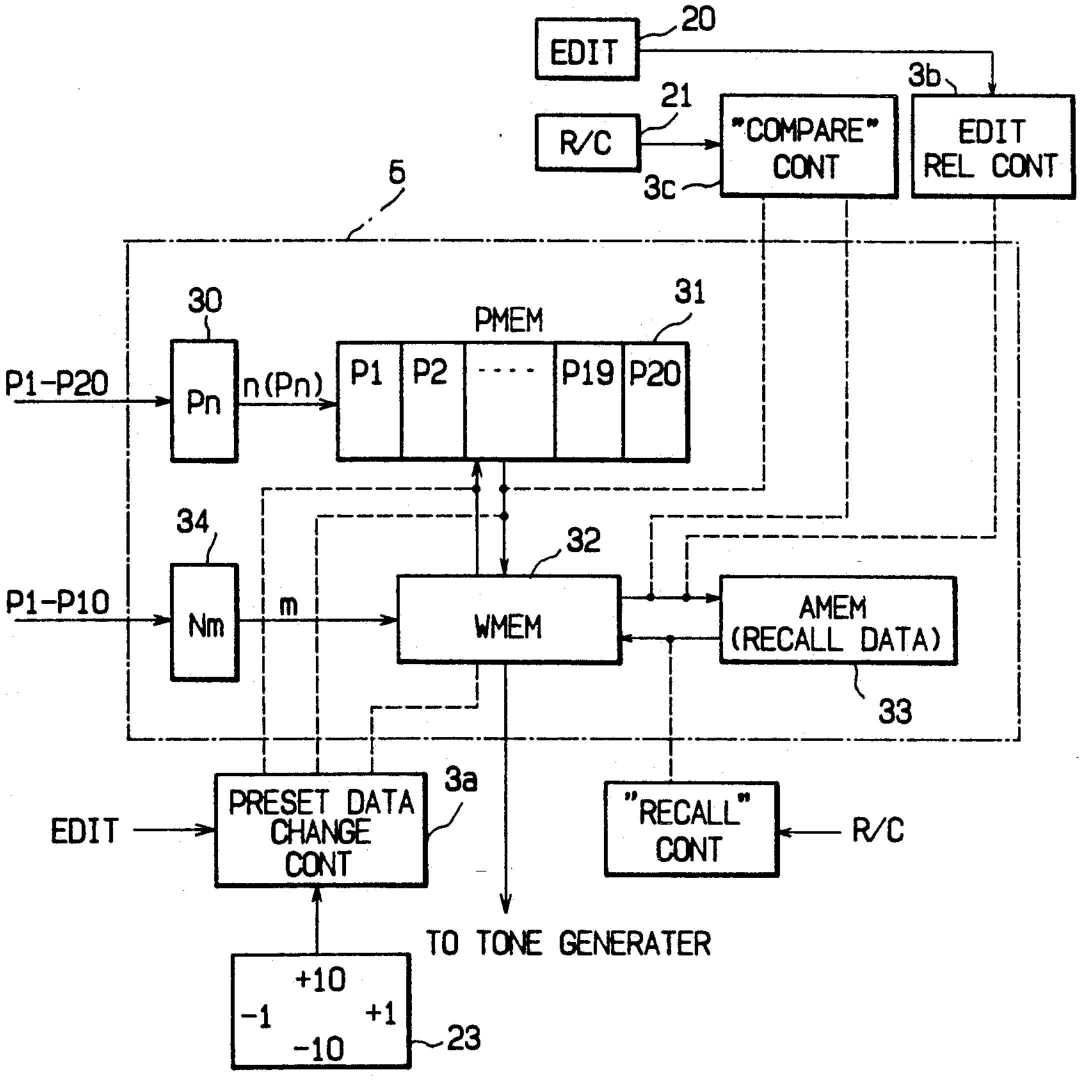
FIG. 3 is a block diagram for explaining constituting elements of the present invention.

The RAM 5 comprises a battery-backup RAM or a nonvolatile RAM. The RAM 5 has storage areas for temporarily storing various data during execution of various processing operations by the CPU 3, and for storing data obtained as the various processing results, and also has storage areas, as shown in FIG. 3.

A preset number holding area 30 is an area for holding a number n for designating preset data stored in the storage areas P1 to P20 of the preset memory 31. When one of the preset data selection switches P1 to P20 of the operation panel 2 is operated to select given preset data (tone color), a number (1 to 20) corresponding to the operated switch is stored in this area 30.

The preset memory 31 stores 20 kinds (20 sets) of initial data read out from the ROM 4 or edited data generated by a user as preset data. Each of preset data stored in the storage areas Pl to P20 of the preset memory 31 corresponds to a set of, e.g., 10 parameter data associated with various parameters set to control a tone color, a tone volume, a pitch, an effect, a rhythm, and the like of a tone to be generated by the electronic musical instrument.

The work memory 32 is set with parameter data to be supplied to the tone generator 6. The parameter data set in the work memory 32 control, e.g., a tone color of a tone which is being generated. The work memory 32 can be selectively set with preset data stored in the preset memory 31 as the parameter data. When the edit mode is selected to edit data, preset data to be edited is set on the work memory 32. The parameter data constituting the preset data set on the work memory 32 can be independently changed by a preset data change controller 3*a* (CPU 3) upon operations of the switches P1 to P20 and the data change switches 23 of the operation panel 2.

When the parameter data are supplied from the work memory 32 to the tone generator 6, the parameter data may be supplied after they are converted to have a data format suitable for data processing in the tone generator 6, or only the changed parameter data may be supplied.

An advance memory 33 simultaneously stores edited parameter data on the work memory 32 as recall data in the edit mode to back up the edited data. More specifically, the advance memory 33 simultaneously stores the edited data in the work memory 32 by an edit release controller 3*b* (CPU 3) when the edit mode is released. Thereafter, when edited data are unexpectedly erased, e.g., when the edited data in the work memory 32 are rewritten with the preset data, the content of the advance memory 33 is read out onto the work memory 32. Thus, the edited data can be easily and reliably recalled.

When the switch 21 of the operation panel 2 is operated to instruct to set a data "compare" state in the edit mode, the advance memory 33 simultaneously stores parameter data constituting edited data in the work memory 32 at that time by a compare controller 3*c* (CPU 3) before new preset data selected from the preset memory 31 is read into the work memory 32. In this manner, tones generated based on the edited data and the preset data can be compared. A user reads out another preset data into the work memory 32 during a data edit operation, and hears tones generated based on the readout preset data, thus comparing the edited data and the other preset data. Upon completion of the comparison, the user can continue the data edit operation by reading out the content of the advance memory 33 into the work memory 32.

Note that the content of the work memory 32 is written in the advance memory 33 to back up data only when the edit mode is released. During the edit mode, even when the data are changed, they are not written in the advance memory 33. Once the edit mode is selected, when data are not changed in the edit mode, the content of the work memory 32 is not written in the advance memory 33 when the edit mode is released. Furthermore, when the above-mentioned "compare" state between the edited data and the preset data is set when the edit mode is released, the content of the work memory 32 is not written in the advance memory 33.

A parameter data number holding area 34 is an area for holding a number m for designating parameter data to be changed of those set on the work memory 32. When one of the switches P1 to P10 of the operation panel 2 is operated to select parameter data to be changed, a number m (1 to 10) corresponding to N1 to N10 indicated below the operated operation member is stored in the area 34.

The tone generator 6 comprises a plurality of tone generation channels, and can simultaneously generate a plurality of tones. The tone generator 6 forms digital tone data on the basis of data representing operation states of the keys and operation members supplied from the CPU 3, and parameter data supplied from the work memory 32 of the RAM 5 under the control of the CPU 3. The tone generator 6 also includes a digital filter, a digital effector, and the like.

Tone data generated by the tone generator 6 is converted into an analog tone signal by a D/A converter 7. The analog tone signal is then subjected to predetermined signal processing in an analog signal processor 8 comprising analog circuits such as an analog filter, an analog mixing circuit, and the like, and the processed signal is then amplified by an amplifier 9. Thereafter, the amplified signal is supplied to a loudspeaker 10.

Figure 4:
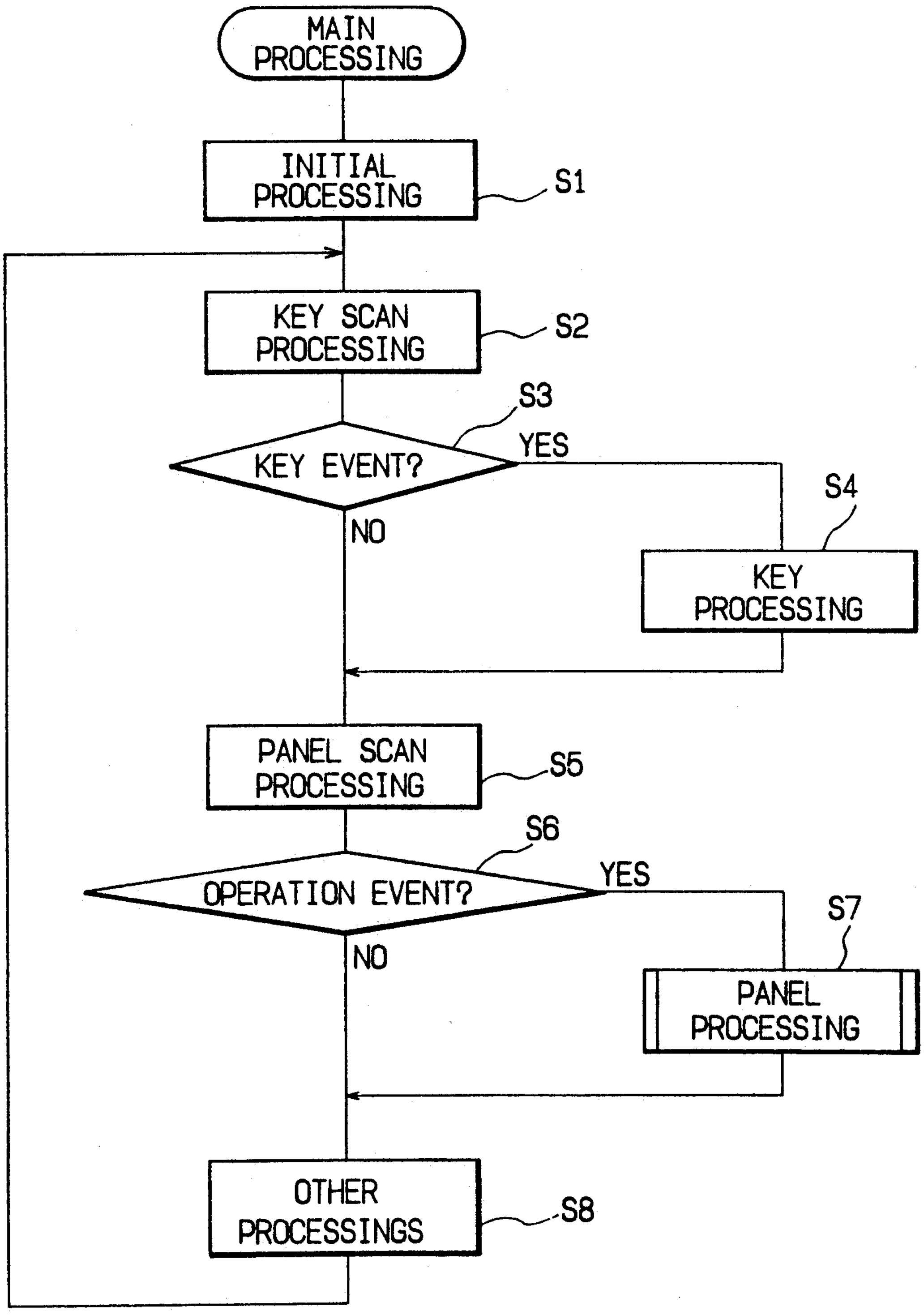
FIG. 4 is a flow chart showing a processing sequence of main processing executed by a CPU.

FIG. 4 is a flow chart showing a processing sequence of main processing executed by the CPU 3.

When the power switch of the electronic musical instrument is turned on, the CPU 3 executes initial processing in step S1, thereby initializing the tone generator (sound source), clearing the RAM 5, and so on.

In step S2, the CPU 3 executes key scan processing for sequentially checking operation states of all the keys of the keyboard 1. If the CPU 3 detects a key event in step S3, the flow advances to step S4, and the CPU 3 executes processing corresponding to the detected key event.

In step S5, the CPU 3 executes panel scan processing for sequentially checking operation states of all the operation members of the operation panel 2. If the CPU 3 detects an event of the operation member in step S6, the flow advances to step S7, and the CPU 3 executes processing corresponding to the detected event of the operation member. Thereafter, the CPU 3 executes other processing in step S8 as needed, and the flow then returns to step S2.

Figure 5:
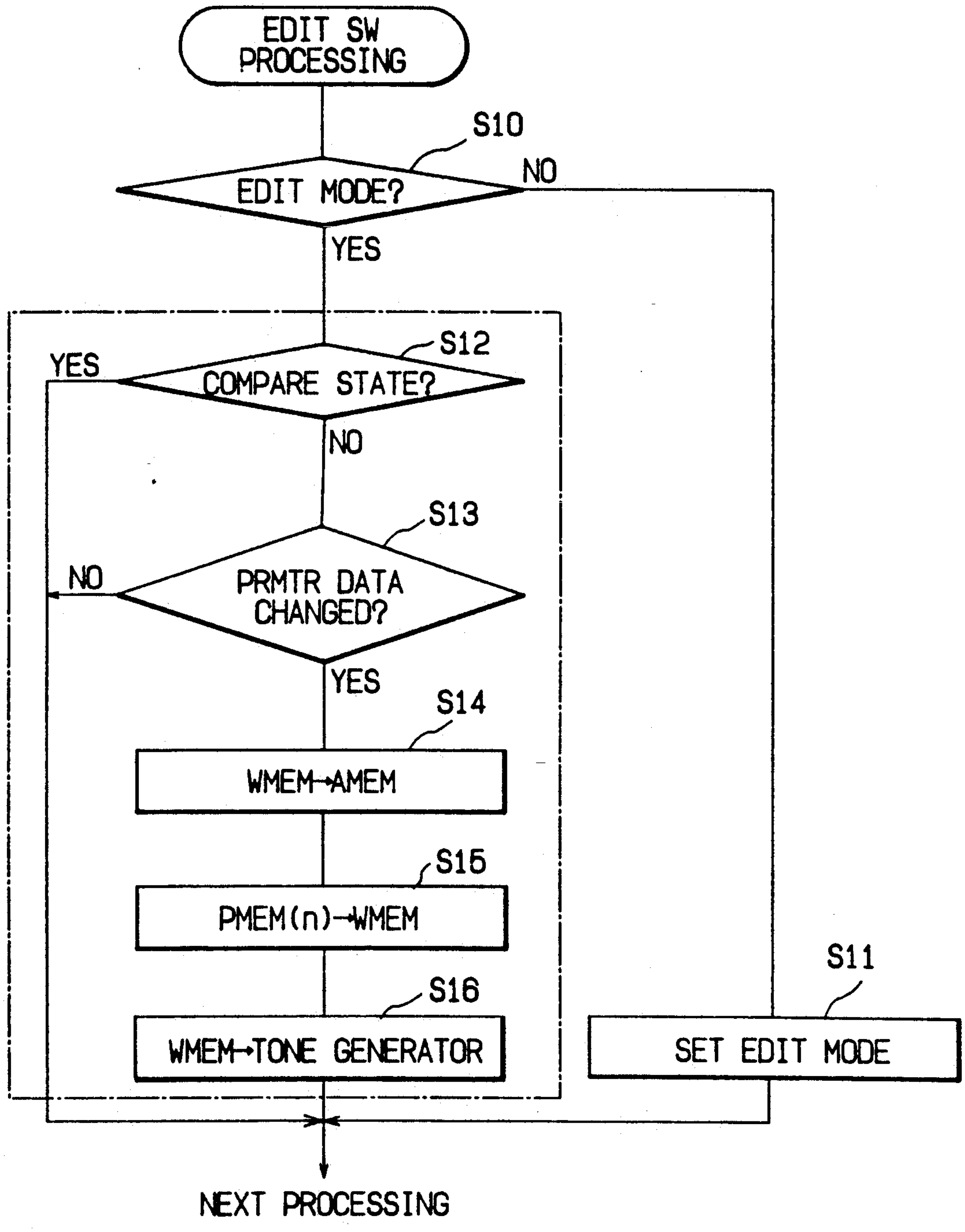
FIG. 5 is a flow chart showing a processing sequence of EDIT switch processing executed by the CPU.

FIGS. 5 to 9 show in detail processing operations executed as subroutines of the panel processing in step S7 in the main processing shown in FIG. 4. FIG. 5 shows processing executed by the CPU 3 when the EDIT switch 20 of the operation panel 2 is operated.

In the processing shown in FIG. 5, the CPU 3 checks in step S10 if the edit mode is currently selected. If NO in step S10, the flow advances to step S11, and the edit mode is set. Thereafter, the CPU 3 executes the next processing. However, if YES in step S10, the CPU 3 executes processing in step S12 and subsequent steps to release the edit mode. The CPU 3 checks in step S12 if the data "compare" state is currently set (whether or not edited data are fetched the advance memory 33, and preset data to be compared is read out into the work memory 32). If NO in step S12, the CPU 3 executes the next processing; otherwise, the flow advances to step S13. In step S13, the CPU 3 checks if parameter data are changed in the edit mode. If it is determined that none of parameter data currently set on the work memory 32 onto the advance memory 33 are changed, the CPU 3 starts the next processing. However, if it is determined that at least one of the parameter data is changed, the flow advances to step S14.

In step S14, the CPU 3 simultaneously stores parameter data constituting the edited data currently set in the work memory 32 into the advance memory 33 so as to back up the edited data upon releasing of the edit mode, and the flow then advances to step S15. In step S15, the CPU 3 reads out preset data from the storage area of the preset memory 31 corresponding to the number n held in the preset number holding area 30, and sets it in the work memory 32. In step S16, the CPU 3 sends the set preset data to the tone generator 6. Thus, tones having a tone color, an effect, and the like corresponding to the preset data are produced from the loudspeaker 10.

Figure 6:
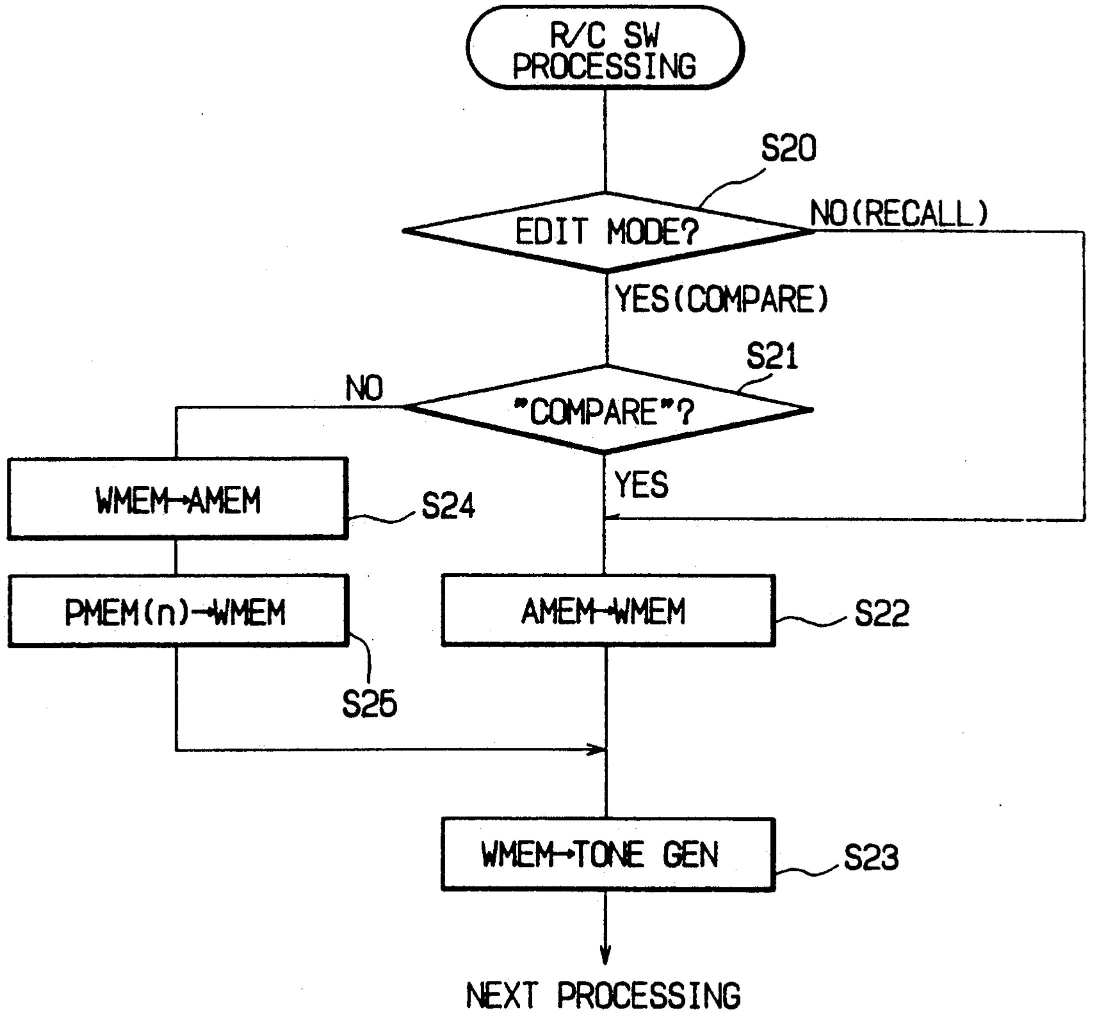
FIG. 6 is a flow chart showing a processing sequence of R/C switch processing executed by the CPU.

FIG. 6 shows processing executed by the CPU 3 when the R/C switch 21 of the operation panel 2 is operated.

In this processing, the CPU 3 checks in step S20 if the edit mode is currently set. If NO in step S20, i.e., if the play mode is set, the flow advances to step S22 to recall the edited data generated in the previous edit mode in the work memory 32. In step S22, the CPU 3 reads out the edited data stored in the advance memory 33 into the work memory 32 to recall the edited data. Thereafter, the flow advances to step S23 to supply the edited data read out into the work memory 32 to the tone generator 6.

On the other hand, if it is determined that the edit mode is currently set, the flow advances to step S21 to check if the data "compare" state is currently set. If YES in step S21, the CPU 3 executes processing operations in steps S22 and S23 described above so as to release the "compare" state, and to read out the edited data temporarily saved on the advance memory 33 during comparison onto the work memory 32.

If it is determined in step S21 that the "compare" state is not currently set, the flow advances to step S24 to set the data "compare" state. In step S24, the CPU 3 saves the edited data currently set on the work memory 32 in the advance memory 33. In step S25, the CPU 3 then reads out preset data to be compared with the saved edited data from the preset memory 31 into the work memory 32. Thus, the data "compare" state is set. Note that preset data read out from the preset memory 31 in step S25 is data stored in the storage area corresponding to the number held in the preset number holding area 30. The preset data read out into the work memory 32 in this manner is supplied to the tone generator 6 in step S23, thereby generating tones based on the preset data from the loudspeaker 10. Therefore, a user compares tones generated based on the edited data set on the work memory 32 so far, and tones generated based on the currently readout preset data by alternately hearing these tones, and he or she can thus compare data.

Figure 7:
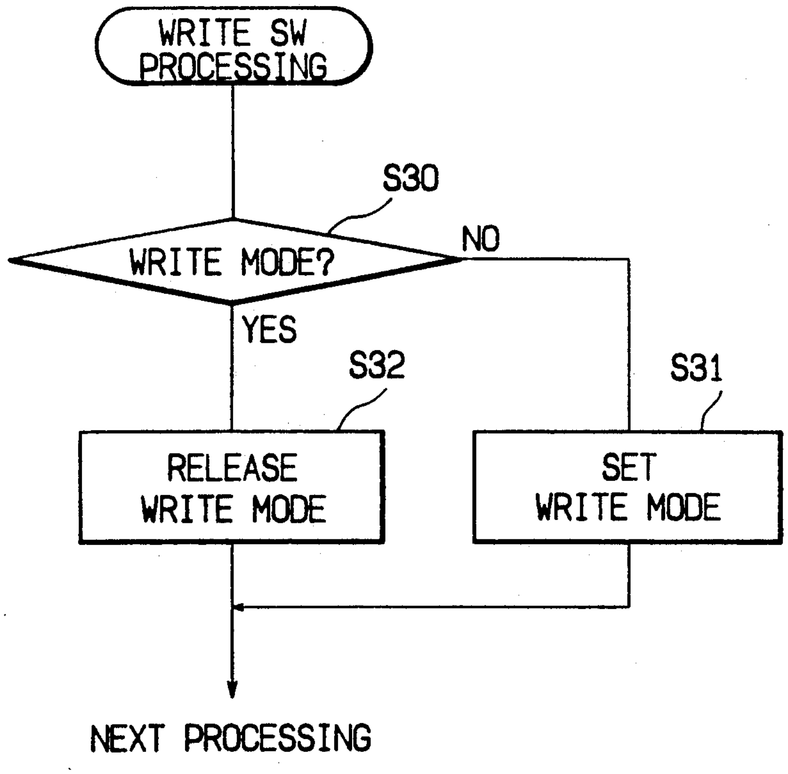
FIG. 7 is a flow chart showing a processing sequence of WRITE switch processing executed by the CPU.

FIG. 7 shows processing executed by the CPU 3 when the WRITE switch 22 of the operation panel 2 is operated.

In this processing, the CPU 3 checks in step S30 if the WRITE mode is currently set. If NO in step S30, the CPU 3 sets the WRITE mode in step S31; otherwise, the CPU 3 releases the WRITE mode in step S32, and then starts the next processing.

Figure 8:
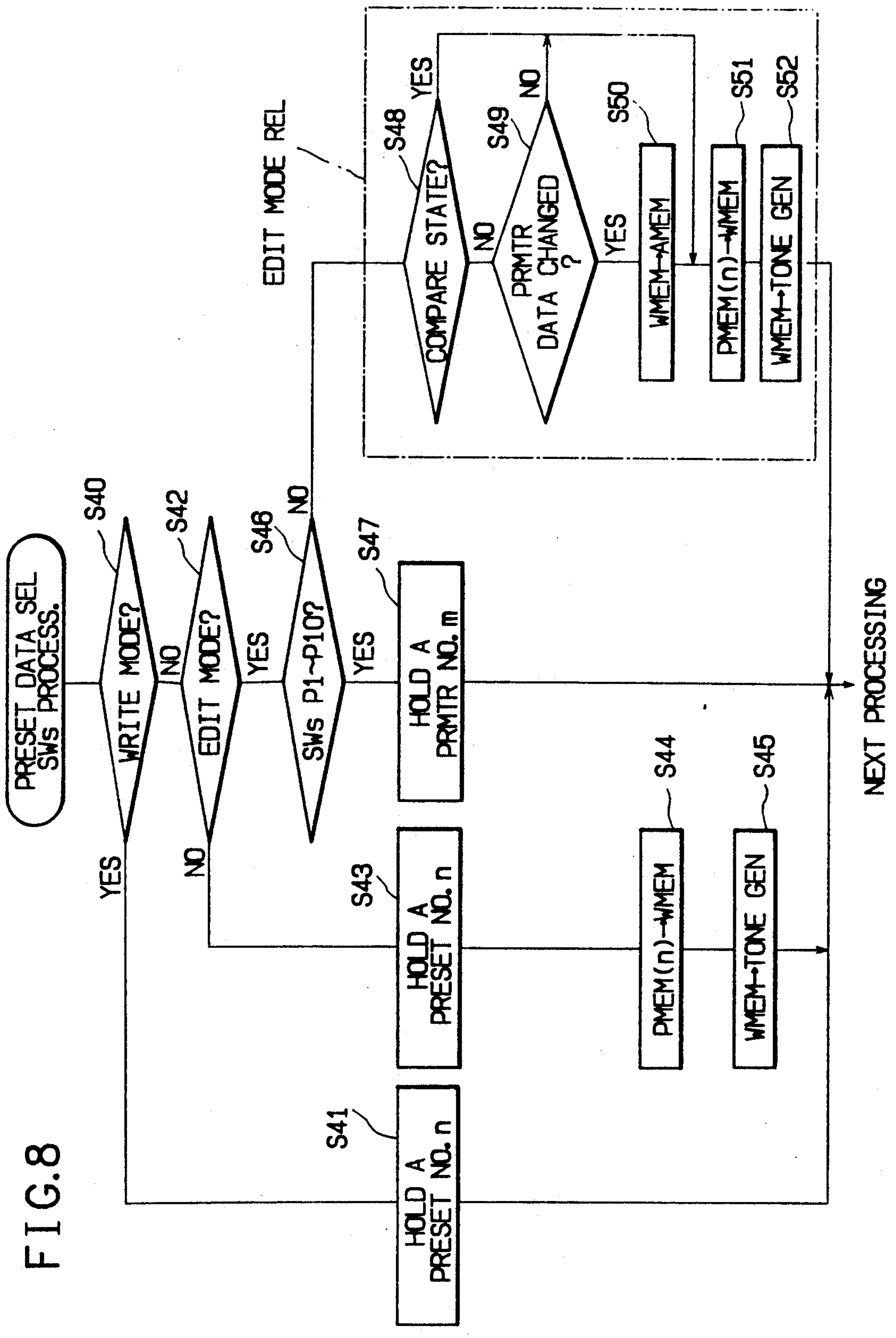
FIG. 8 is a flow chart showing a processing sequence of preset data selection switch processing executed by the CPU.

FIG. 8 shows processing executed by the CPU 3 when one of the preset data selection switches 24 (the switches P1 to P20) of the operation panel 2 is operated.

In this processing, the CPU 3 checks in step S40 if the WRITE mode is currently set. If YES in step S40, the flow advances to step S41 to set a number of a storage area for storing the edited data currently set on the work memory 32, of the preset memory 31. The number n corresponding to an operated switch of the switches P1 to P20 is held in the preset number holding area 30. In step S44, and the CPU 3 then starts the next processing.

If it is determined in step S41 that the WRITE mode is not currently set, the flow advances to step S42 to check if the edit mode is currently set. If NO in step S42, i.e., if the play mode is currently set, the flow advances to step S43 to execute normal preset data selection processing. In step S43, the number n corresponding to a currently operated operation member of the operation members Pl to P20 is held in the preset number holding area 30. In step S44, preset data is read out from the storage area, corresponding to the held number, of the preset memory 31 in the basis of the held number, and the readout data is set in the work memory 32. In step S45, the preset data set in the work memory 32 is supplied to the tone generator 6. Thereafter, the CPU 3 starts the next processing.

On the other hand, if it is determined in step S42 that the edit mode is currently set, the flow advances to step S46 to check if the currently operated switch is one of the switches Pl to P10. If YES in step S46, the flow advances to step S47 to store the number m corresponding to one of the indications N1 to N10 below the currently operated switch in the parameter data number holding area 34 of the RAM 5. Thereafter, the CPU 3 starts the next processing. Thus, parameter data to be changed is designated.

If it is determined in step S46 that the currently operated switch is not one of the switches Pl to P10, i.e., that the currently operated switch is one of the switches P11 to P20, processing in step S48 and subsequent steps is executed to release the edit mode. More specifically, it is checked in step S48 if the data "compare" state is currently set. If YES in step S48, the flow advances to step S51 without storing data in the advance memory 33. When data currently set in the work memory 32 are stored in the advance memory 33 upon releasing of the edit mode, the edited data saved on the advance memory 33 at that time in the "compare" state are rewritten with the preset data set in the work memory 32. If it is determined that the data "compare" state is not set, it is checked in step S49 if parameter data are changed in the current edit mode. If NO in step S49, the flow advances to step S51 without executing data backup processing in step S50.

On the other hand, if it is determined that the parameter data are changed in the current edit mode, the edited data must be backed up when the edit mode is released. Thus, the parameter data constituting the edited data currently set in the work memory 32 are simultaneously stored in the advance memory 33 in step S50. The flow then advances to step S51. In step S51, preset data is read out from the corresponding storage area of the preset memory 31 indicated by the number n held in the preset number holding area 30, and is set in the work memory 32. In step S52, the new preset data is sent to the tone generator 6, and the next processing is then executed.

Figure 9:
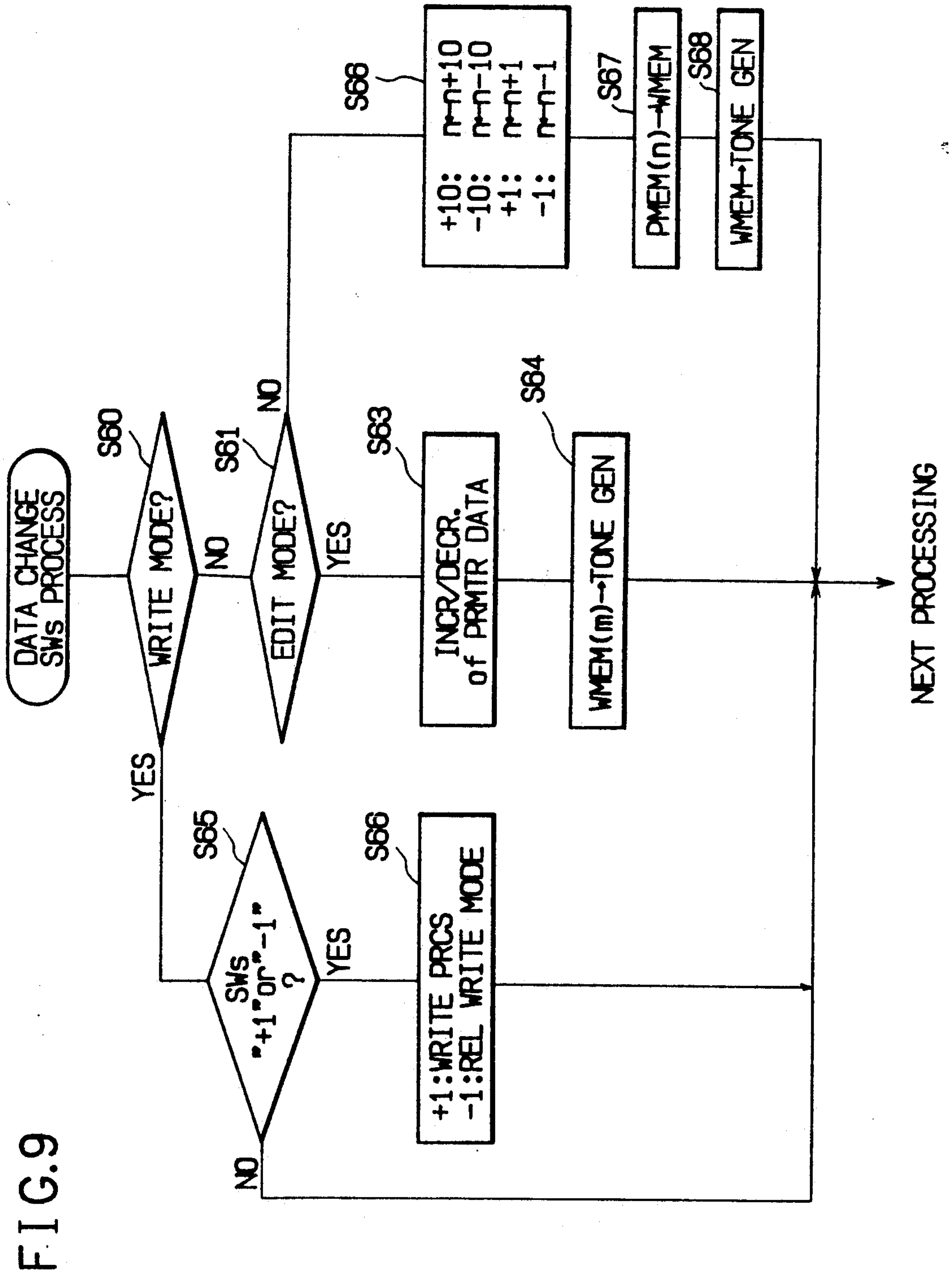
FIG. 9 is a flow chart showing a processing sequence of data change switch processing executed by the CPU.

FIG. 9 shows processing executed by the CPU 3 when one of the data change switches 23 of the operation panel 2 is operated.

In this processing, it is checked in step S60 if the WRITE mode is currently set, and it is then checked in step S61 if the edit mode is set. If it is detected that neither the WRITE mode nor the edit mode are set, i.e., that the play mode is currently set, the flow advances to step S62 to increment/decrement the number n for designating preset data. More specifically, the number n stored in the preset number holding area 30 at that time is incremented/decremented in accordance with an operated switch of the +10, −10, +1, and −1 switches. In this embodiment, since the number n to be selected (the number of storage areas of the preset memory 31) satisfies $1 \leqq n \leqq 20$, if the new number as a result of incrementing/decrementing the value falls outside the above-mentioned range, control is made so as not to select a number outside the range to have 1 and 20 as upper and lower limits, or control is made to reverse the incrementing/decrementing direction at 1 or 20. Upon completion of the processing in step S62, the flow advances to step S67 to execute normal preset data selection processing. In step S67, preset data is read out from the corresponding storage area of the preset memory 31 on the basis of the newly set number n, and is set in the work memory 32. In step S68, the preset data set in the work memory 32 is supplied to the tone generator 6. Thereafter, the flow then advances to the next processing.

If it is determined in steps S60 and S61 that the WRITE mode is not currently set, and the edit mode is set, the flow advances to step S63. In step S63, a value represented by parameter data designated by the number m held in the parameter data number holding area 34 at that time of the parameter data currently set on the work memory 32 is subjected to a calculation of +10, −10, +1, or −1 in accordance with the currently operated switch, thereby incrementing/decrementing the value of the corresponding parameter data. In step S64, the parameter data whose value is changed is sent to the tone generator 6.

If it is determined in step S60 that the WRITE mode is currently set, the flow advances to step S65. It is checked in step S65 if the currently operated switch is the +1 or −1 switch. If it is determined that the operated switch is one other than these switches, i.e., the +10 or −10 switch, the flow advances to the next processing without executing write processing in step S66. If it is determined that the operated switch is the +1 or −1 switch, the flow advances to step S66. If the operated switch is the +1 switch, write processing is executed. In the write processing, the CPU 3 writes edited data set on the work memory 32 at that time in the storage area of the preset memory 31, which area corresponds to the number n designated in step S41 in FIG. 8. In this manner, the currently edited data are stored in the preset memory 31 as preset data. If the operated switch is the −1 switch, the currently set WRITE mode is released, and the flow advances to the next processing.

As described above, according to the above embodiment, the edited data in the work memory 32, which are edited in the edit mode are automatically stored in the advance memory 33 (see step S14 in FIG. 5 and step S50 in FIG. 8) when the edit mode is released (see steps S12 to S16 in FIG. 5, and steps S48 to S52 in FIG. 8). Even when new preset data is selected (see steps S43 and S44 in FIG. 8) after the edit mode is released, and the edited data set on the work memory 32 are unexpectedly rewritten with the preset data, the data stored in the advance memory 33 can be read out into the work memory 32 (see steps S20 and S22 in FIG. 6), thereby easily and reliably recalling the edited data. Since data are stored in the advance memory 33 to back up the edited data only when the edit mode is canceled, a time required for data change processing can be shortened as compared to a case wherein the content of the advance memory 33 is rewritten every time data constituting the preset data set in the work memory 32 are changed. When the number of parameters to be set is increased, the number of processing operations for storing changed data associated with the parameters in the advance memory 33 need not be increased. Therefore, the number of processing operations to be executed by the CPU 3 need not be increased. As a result, the number of processing operations to be executed by the CPU 3 can be decreased, and an execution program stored in the ROM 4 can be simplified.

Once the edit mode is selected and set, if preset data (data to be edited) is not changed in the edit mode, a data storage operation to the advance memory 33 is inhibited when the edit mode is released (see steps S13 and S14 in FIG. 5, and steps S49 and S50 in FIG. 8). For example, when given preset data is read into the work memory 32 and is edited in the edit mode, if the edit mode is temporarily released to set the play mode, and thereafter, a data edit operation is to be restarted, the edit mode should be set after the edited data are recalled in the work memory 32 by operating the R/C switch 21. However, the edit mode may be erroneously set without operating the R/C switch 21, or the edit mode may be erroneously set by an operation error of the operation member. In this case, the edit mode must be released to set the play mode again. When the edit mode is released in this case, the edited data stored in the advance memory 33 can be prevented from being rewritten with the preset data on the work memory 32. Therefore, when a user becomes aware of an operation error, and releases the edit mode to set the play mode again, the edited data on the advance memory 33 can be protected without being replaced with another preset data.

When the R/C switch 21 is operated to instruct to set the "compare" state between the edited data set on the work memory 32 and the preset data stored in the preset memory 31 while the edit mode is selected (see FIG. 6), the edited data set on the work memory 32 at that time are automatically stored in the advance memory 33, and thereafter, the designated preset data is read out into the work memory 32, thereby setting the "compare" state of the two data (see steps S24 and S25 in FIG. 6). For this reason, an operation of the operation member for setting the "compare" state can be simplified, and comparison between the edited data and preset data can be quickly and easily performed. In addition, as a storage means for storing the edited data, the advance memory 33 is utilized. More specifically, the advance memory 33 can serve as both a backup memory for protecting edited data due to overlooking of an operation of the operation member, and a memory for temporarily storing edited data to set the "compare" state. Therefore, the number of memories can be decreased (storage areas can be saved).

The "compare" state between the edited data and the preset data can be set in only the edit mode (see steps S20, S21, S24, and S25 in FIG. 6). Thus, when the edit mode is released, backup data stored in the advance memory 33 can be prevented from being unexpectedly erased upon data comparison executed after the edit mode is released.

When it is determined that the data "compare" state is set when the edit mode is released, data on the work memory 32 are inhibited from being stored in the advance memory 33 (see step S12 in FIG. 5 and step S48 in FIG. 8). Edited data stored in the advance memory 33 upon setting of the "compare" state can be prevented from being rewritten with and erased by preset data read out into the work memory 32 for the purpose of comparison when the edit mode is released.

The embodiment of the present invention has been described. However, the present invention is not limited to the above embodiment, and various effective modifications may be made based on the technical concept of the present invention. For example, in the above embodiment, a set of preset data consists of 10 parameter data. However, the number of parameter data constituting a set of preset data is not limited to 10. In addition, parameter data constituting the preset data may be data for characterizing, e.g., only tone colors of tones.

The preset memory 31 of the above embodiment can store 20 sets of preset data. However, the number of sets of preset data to be stored in the preset memory 31 is not limited to this.

A setting operation of the data "compare" state need not be instructed by the R/C switch 21. For example, the setting operation of the data "compare" state may be automatically instructed when preset data is selected in the edit mode.

The parameter setting apparatus of the present invention can be used as one for various electronic musical instruments such as an electronic keyboard, an electronic piano, and the like as well as a synthesizer. The parameter setting apparatus need not always be arranged integrally with the electronic musical instrument, but may be separately arranged from the electronic musical instrument.

According to the present invention, edited data on the supply data storage means, which data are edited in the edit mode, are automatically stored in the recall data storage means when the edit mode is released. Even when new preset data is selected after the edit mode is released, and the edited data set on the supply data storage means are unexpectedly rewritten with the new preset data, the data stored in the recall data storage means can be read out into the supply data storage means, thus easily and reliably recalling the edited data.

Since a data storage operation to the recall data storage means is performed only when the edit mode is released, a time required for data change processing can be shortened as compared to a case wherein the content of the recall data storage means is rewritten every time data constituting preset data set on the supply data storage means are changed. Even when the number of parameters to be set is increased, the number of processing operations for storing changed data associated with the parameters in the recall data storage means need not be increased. Therefore, the volume of processing to be executed by the data processor need not be increased. As a result, the volume of processing to be executed by the data processor can be decreased, and an execution program can be simplified.

When the setting operation of the "compare" state between edited data set in the supply data storage means and preset data stored in the preset data storage means is instructed during a data edit operation upon operation of the operation member, the edited data present in the supply data storage means at that time are automatically stored in the recall data storage means. Thereafter, the designated preset data is read into the supply data storage means, and the "compare" state between the two data is set. Therefore, an operation of the operation member for setting the "compare" state can be simplified, and comparison between the edited data and the preset data can be quickly and easily performed. In addition, as a storage means for storing the edited data upon comparison, the recall data storage means is used. The recall data storage means can serve as both a backup memory for protecting edited data due to overlooking of an operation of the operation member, and a memory for temporarily storing edited data to set the "compare" state. Therefore, the number of memories can be decreased (storage areas can be saved).

When it is determined that the "compare" state is set when the edit mode is released, a storage operation of data on the supply data storage means to the recall data storage means is inhibited. As a result, edited data stored in the recall data storage means upon setting of the "compare" state can be prevented from being written with and erased by preset data read out onto the supply data storage means for the purpose of comparison when the edit mode is released.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tone parameter editing apparatus for an electronic musical instrument, comprising:

preset data storage means for storing a plurality of sets of preset data, each set including parameters for determining tone color and tone volume utilized to generate musical tones;

selection means, connected to said preset data storage means for selecting one of said plurality of sets of preset data;

parameter storage means, connected to said preset data storage means, for storing a set of parameter data;

data saving means for storing a duplicate of the set of parameter data stored in said parameter storage means;

tone generator means for generating a musical tone from the set of parameter data stored in said parameter storage means;

data modifying means for modifying the set of parameter data stored in said parameter storage means;

operating means for initiating one of a recall operation and a compare operation;

data transfer means for, transferring the set of parameter data stored in said parameter storage means to said data saving means and for transferring the selected one of said plurality of sets of preset data to said parameter storage means when the compare operation is initiated by said operation means and a compare state has not previously been set, transferring the set of parameter data stored in said data saving means to said parameter storage means when the compare operation is initiated by said operation means and the compare state has previously been set;

edit mode set/release means for setting an edit mode for modifying the set of parameter data in said parameter storage means by said data modifying means and for releasing the edit mode;

release operation control means, operable when the edit mode is released, for transferring the modified set of parameter data in said parameter storage means to said data saving means to save the modified set of parameter data; and data recall means for transferring the modified set of parameter data stored in said data saving means to said parameter storage means when the edit mode is released and said operation means for recall operation is initiated.

2. The tone parameter editing apparatus of claim 1, further comprising:

edit mode set/release means for setting an edit mode for modifying the set of parameter data in said parameter storage means by said data modifying means and for releasing the edit mode; and release operation control means, operable when the edit mode is released, for transferring the modified set of parameter data in said parameter storage means to said data saving means to save the modified set of parameter data.

3. The tone parameter editing apparatus of claim 1, wherein said data modifying means includes operation means for incrementing and decrementing each parameter value of the set of parameter data.

4. The tone parameter editing apparatus of claim 1, further comprising:

edit mode set/release means for setting an edit mode for modifying the set of parameter data in said parameter storage means by said data modifying means and releasing the edit mode;

determination means for determining whether a compare operation state is set when the edit mode is released; and control means for inhibiting transfer of the set of parameter data in said parameter storage means to said data saving means when the edit mode is released when said determination means determines that the compare operation state is set.

5. The tone parameter editing apparatus of claim 1, wherein said operation means for initiating one of the recall operation and compare operation, includes alternate switch means for alternately designating the recall operation and compare operation.

6. The tone parameter editing apparatus of claim 1, further comprising:

edit mode set/release means for setting an edit mode for modifying the set of parameter data in said parameter storage means by said data modifying means and releasing the edit mode;

determination means for determining whether any parameter value of the set of parameter data in said parameter storage means was modified when the edit mode is released; and control means for inhibiting transfer of the set of parameter data in said parameter storage means to said data saving means when the edit mode is released when said determination means determines that none of the parameter values of the set of parameter data were modified.

7. A tone parameter editing apparatus for an electronic musical instrument, comprising:

preset data storage means for storing a plurality of sets of preset data, each set including parameters for determining tone color and tone volume utilized to generate musical tones;

selection means, connected to said preset data storage means for selecting one of said plurality of sets of preset data;

parameter storage means, connected to said preset data storage means, for storing a set of parameter data;

data saving means for storing a duplicate of the set of parameter data stored in said parameter storage means;

tone generator means for generating a musical tone from the set of parameter data stored in said parameter storage means;

data modifying means for modifying the set of parameter data stored in said parameter storage means;

operating means for initiating one of a recall operation and a compare operation;

data transfer means for transferring the set of parameter data stored in said parameter storage means to said data saving means and for transferring the selected one of said plurality of sets of parameter data to said parameter storage means when the compare operation is initiated;

data recall means for transferring the set of parameter data stored in said data saving means to said parameter storage means when the recall operation is initiated by said operating means;

edit mode set/release means for setting an edit mode for modifying the set of parameter data in said parameter storage means by said data modifying means and releasing the edit mode;

determination means for determining whether a compare operation state is set when the edit mode is released; and control means for inhibiting transfer of the set of parameter data in said parameter storage means to said data saving means when the edit mode is released when said determination means determines that the compare operation state is set.

8. A tone parameter editing apparatus for an electronic musical instrument, comprising:

preset data storage means for storing a plurality of sets of preset data, each set including parameters for determining tone color and tone volume utilized to generate musical tones;

selection means, connected to said preset data storage means for selecting one of said plurality of sets of preset data;

parameter storage means, connected to said preset data storage means, for storing a set of parameter data;

data saving means for storing a duplicate of the set of parameter data stored in said parameter storage means;

tone generator means for generating a musical tone from the set of parameter data stored in said parameter storage means;

data modifying means for modifying the set of parameter data stored in said parameter storage means;

operating means for initiating one of a recall operation and a compare operation;

data transfer means for transferring the set of parameter data stored in said parameter storage means to said data saving means and for transferring the selected one of said plurality of sets of parameter data to said parameter storage means when the compare operation is initiated;

data recall means for transferring the set of parameter data stored in said data saving means to said parameter storage means when the recall operation is initiated by said operating means;

edit mode set/release means for setting an edit mode for modifying the set of parameter data in said parameter storage means by said data modifying means and releasing the edit mode;

determination means for determining whether any parameter value of the set of parameter data in said parameter storage means was modified when the edit mode is released; and control means for inhibiting transfer of the set of parameter data in said parameter storage means to said data saving means when the edit mode is released when said determination means determines that none of the parameter values of the set of parameter data were modified.

* * * * *